US009777830B2

(12) United States Patent
Tsuchida et al.

(10) Patent No.: US 9,777,830 B2
(45) Date of Patent: Oct. 3, 2017

(54) POWER TRANSMISSION DEVICE (71) Applicant: AISIN AW CO., LTD., Anjo-shi, Aichi-ken (JP)

(72) Inventors: Kenichi Tsuchida, Nishio (JP); Yoshimitsu Hyodo, Nishio (JP); Yuhei Yoshioka, Anjo (JP); Nobuhiko Miyamoto, Nukata (JP); Mitsuhiro Hasama, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 62 days.

(21) Appl. No.: 14/913,060

(22) PCT Filed: Sep. 24, 2014

(86) PCT No.: PCT/JP2014/075254
§ 371 (c)(1),
(2) Date: Feb. 19, 2016

(87) PCT Pub. No.: WO2015/046233
PCT Pub. Date: Apr. 2, 2015

(65) Prior Publication Data
US 2016/0201796 A1    Jul. 14, 2016

(30) Foreign Application Priority Data

Sep. 25, 2013  (JP) .................................. 2013-198548

(51) Int. Cl.
*F16H 61/02* (2006.01)
*F16H 57/02* (2012.01)
(Continued)

(52) U.S. Cl.
CPC ......... *F16H 61/0267* (2013.01); *F04B 23/10* (2013.01); *F04B 23/12* (2013.01);
(Continued)

(58) Field of Classification Search
None
See application file for complete search history.

(56) References Cited

U.S. PATENT DOCUMENTS

2008/0308355 A1\* 12/2008 Kakinami ............... F16H 57/04
184/27.2
2010/0181159 A1    7/2010 Shimizu et al.
(Continued)

FOREIGN PATENT DOCUMENTS

JP      H03-134368 A    6/1991
JP      2004-332886 A   11/2004
(Continued)

OTHER PUBLICATIONS

Dec. 22, 2014 International Search Report issued in International Patent Application No. PCT/JP2014/075254.

*Primary Examiner* — Ramya Burgess
*Assistant Examiner* — Timothy M Hannon
(74) *Attorney, Agent, or Firm* — Oliff PLC (57) ABSTRACT

A power transmission device that is mounted on a vehicle and provided with a transmission having a plurality of engagement elements for transmitting power from a motor to an axle, a case that accommodates the transmission, and a hydraulic control device that controls hydraulic pressure to the plurality of engagement elements.

10 Claims, 9 Drawing Sheets

(51) Int. Cl.
*F04B 23/10* (2006.01)
*F04B 23/12* (2006.01)
*F16H 61/00* (2006.01)
*F16H 57/04* (2010.01)

(52) U.S. Cl.
CPC ......... *F16H 57/02* (2013.01); *F16H 57/0443* (2013.01); *F16H 61/0031* (2013.01)

(56) References Cited

U.S. PATENT DOCUMENTS

| | | | |
|---|---|---|---|
| 2012/0137670 A1* | 6/2012 | Shimizu | F16H 61/0021 60/430 |
| 2012/0144818 A1 | 6/2012 | Shimizu et al. | |
| 2012/0234645 A1* | 9/2012 | Shimizu | F16H 61/0206 192/85.63 |
| 2012/0247902 A1* | 10/2012 | Moorman | F16H 61/0206 192/3.58 |
| 2013/0319366 A1* | 12/2013 | Karasawa | F01M 1/02 123/196 R |

FOREIGN PATENT DOCUMENTS

| | | |
|---|---|---|
| JP | 2008-267498 A | 11/2008 |
| JP | 2010-164178 A | 7/2010 |
| JP | 2012-122560 A | 6/2012 |

\* cited by examiner

|   | C1 | C2 | B1 | B2 | B3 | F1 |
|---|---|---|---|---|---|---|
| P |   |   |   |   |   |   |
| REV |   |   | O |   | O |   |
| N |   |   |   |   |   |   |
| D 1st | O |   |   |   | (O) | O |
| D 2nd | O |   |   | O |   |   |
| D 3rd | O |   | O |   |   |   |
| D 4th | O | O |   |   |   |   |
| D 5th |   | O | O |   |   |   |
| D 6th |   | O |   | O |   |   |

*( O ) : ENGAGED WHEN ENGINE BRAKE IS IN OPERATION

POWER TRANSMISSION DEVICE

BACKGROUND

The present disclosure relates to a power transmission device, and particularly relates to a power transmission device that is mounted on a vehicle and provided with a transmission having a plurality of engagement elements for transmitting power from a motor to an axle, a case that accommodates the transmission, and a hydraulic control device that controls hydraulic pressure to the plurality of engagement elements.

There has been proposed a power transmission device of this type that is mounted on a vehicle and includes an automatic transmission having a plurality of clutches; a hydraulic circuit serving as an actuator that drives the plurality of clutches; and a mechanical oil pump that is driven by power from the engine, suctions hydraulic oil from an oil pan via a strainer, and supplies the hydraulic oil to the hydraulic circuit; and an electromagnetic pump that is driven by the electromagnetic force and suctions the hydraulic oil from an oil passage between the strainer and the mechanical oil pump to be able to supply the hydraulic oil to a clutch to be engaged when starting the vehicle (see, for example, Japanese Patent Application Publication No. 2010-164178). In this device, while the engine has automatically stopped, hydraulic pressure is applied to the clutch for starting the vehicle from the electromagnetic pump instead of a linear solenoid valve of the hydraulic circuit. Thus, the clutch can be quickly engaged by the linear solenoid valve immediately after a subsequent automatic start of the engine, and the vehicle can smoothly start.

SUMMARY

In such a power transmission device, air is often accumulated in the upper part of a first oil passage between a strainer and a mechanical oil pump. In the case where a second oil passage that provides communication between the first oil passage and an electromagnetic pump extends in the horizontal direction in the power transmission device or upward with respect to the horizontal direction, from the communication position communicating with the first oil passage toward the suction port of the electromagnetic pump, when air is accumulated in the upper part of the first oil passage, the air reaches the second oil passage and eventually the electromagnetic pump, and thus the electromagnetic pump may suction the air. In particular, this phenomenon is likely to occur when the vehicle is inclined due to a gradient of the road surface. If the electromagnetic pump suctions air, the electromagnetic pump is not able to generate sufficient hydraulic pressure. Thus, when hydraulic pressure needs to be applied from the electromagnetic pump to a clutch for starting the vehicle, the hydraulic pressure to be applied to the clutch may be reduced (insufficient). Generally, in the case where a pump (for example, an electric pump) that discharges hydraulic oil by the rotational driving of a rotor is used, even if air is suctioned, it is possible to discharge the air by the rotational driving of the rotor. However, in the case where a pump (for example, an electromagnetic pump) that discharges hydraulic oil by the reciprocating movement of a piston is used, if air is suctioned, it is difficult to discharge the air. Further, in the case where a pump that discharges hydraulic oil by the reciprocating movement of a piston is used for supplying hydraulic pressure to a clutch for starting the vehicle, a relatively small pump is often used, and therefore the discharge pressure is more likely to be reduced when air is suctioned. Accordingly, in the case where a pump that discharges hydraulic oil by the reciprocating movement of a piston is used for supplying hydraulic pressure to a clutch for starting the vehicle, it is required to suppress suction of air by the pump.

A power transmission device according to an exemplary aspect of the present disclosure is able to suppress suction of air by a pump that operates by receiving supply of electric power and supplies hydraulic pressure to an engagement element that is engaged when starting a vehicle.

The power transmission device according to an exemplary aspect of the present disclosure is mounted on a vehicle and provided with a transmission having a plurality of engagement elements for transmitting power from a motor to an axle, a case that accommodates the transmission, and a hydraulic control device that controls hydraulic pressure to the plurality of engagement elements, the power transmission device including: a hydraulic oil storing portion that stores hydraulic oil; a first pump that is operated by power from the motor, and that suctions the hydraulic oil stored in the hydraulic oil storing portion and supplies the hydraulic oil with an increased pressure to the hydraulic control device; a second pump that is configured as a reciprocating pump in which a piston reciprocates by receiving supply of electric power, and that suctions the hydraulic oil stored in the hydraulic oil storing portion and supplies the hydraulic oil with an increased pressure to a starting engagement element that is engaged when a vehicle starts, among the plurality of engagement elements; a first oil passage that provides communication between the hydraulic oil storing portion and the first pump; and a second oil passage that provides communication between the first oil passage and the second pump; in which the second oil passage is formed toward a suction port of the second pump so as to extend downward with respect to a horizontal direction throughout the whole second oil passage from a communication position communicating with the first oil passage.

In the power transmission device according to the present disclosure, the first oil passage provides communication between the hydraulic oil storing portion that stores hydraulic oil and the first pump that is operated by power from a motor, the second oil passage provides communication between the first oil passage and the second pump that is configured as a reciprocating pump in which a piston reciprocates by receiving supply of electric power. Further, the second oil passage is formed toward the suction port of the second pump so as to extend downward with respect to the horizontal direction throughout the whole second oil passage from the communication position communicating with the first oil passage. Thus, even if air is accumulated in the upper part of the first oil passage, the air (accumulated air) is suppressed to reach the second oil passage and eventually the suction port of the second pump. Accordingly, it is possible to suppress suction of air by the second pump. Further, in the case where the second pump is used for supplying hydraulic pressure to the starting engagement element, it is required to suppress suction of air by the second pump for the reasons described above. With the configuration of the power transmission device according to the present disclosure, it is possible to sufficiently suppress suction of air by the second pump. Further, by suppressing suction of air by the second pump, it is possible to suppress a reduction in the hydraulic pressure to be applied from the second pump to the starting engagement element.

In the power transmission device according to the present disclosure, the first oil passage may include a body-side oil passage that is formed in a valve body of the hydraulic control device and communicates with the hydraulic oil storing portion via a strainer, and a case-side oil passage that is formed in the case and provides communication between the body-side oil passage and the first pump; the second oil passage may be formed in the valve body and provide communication between the case-side oil passage and the second pump; the case-side oil passage, the second oil passage, and the second pump may be arranged in this order from an upper side of the vehicle; and the second pump may be disposed such that the suction port overlaps the case-side oil passage in a vehicle up-down direction as seen from at least one of a vehicle front-rear direction and a vehicle left-right direction. Thus, the distance between the case-side oil passage and the second pump in the vehicle front-rear direction and the vehicle left-right direction can be reduced. Accordingly, even if air is accumulated in the upper part of the case-side oil passage, as long as the vehicle is not more greatly inclined, the air (accumulated air) is suppressed to reach the second oil passage and the suction port of the second pump, and further suction of air is suppressed by the second pump.

In the power transmission device according to an aspect of the present disclosure in which the suction port of the second pump overlaps the case-side oil passage in the vehicle up-down direction as seen from at least one of the vehicle front-rear direction and the vehicle left-right direction, the vehicle may be a rear-wheel-drive vehicle, and the second pump may be disposed such that the suction port overlaps the case-side oil passage in the vehicle up-down direction as seen from the vehicle front-rear direction. Thus, when the vehicle is inclined in the left-right direction and air is accumulated in the upper part of the case-side oil passage, it is possible to further suppress suction of air by the second pump. In the power transmission device according to this aspect of the present disclosure, the second pump may be disposed such that the suction port overlaps the case-side oil passage in the vehicle up-down direction and/or overlaps an outlet of the strainer, as seen from the vehicle left-right direction. Thus, when the vehicle is inclined in the front-rear direction and air is accumulated in the upper part of the case-side oil passage, it is possible to further suppress suction of air by the second pump.

In the power transmission device according to the present disclosure, the power transmission device may be mounted on the rear-wheel-drive vehicle such that a vehicle rear side of the rear-wheel-drive vehicle is disposed lower than a vehicle front side of the rear-wheel-drive vehicle, and the second pump may be disposed such that the suction port is located at a lower side with respect to the communication position and at a vehicle rear side with respect to the communication position. Thus, the second oil passage can be formed toward the suction port of the second pump so as to extend downward with respect to the horizontal direction throughout the whole second oil passage from the communication position communicating with the first oil passage.

In the power transmission device according to the present disclosure, the second pump may be configured as an electromagnetic pump that generates hydraulic pressure by an electromagnetic force, and may be mounted on the valve body. Thus, the distance between the electromagnetic pump and a portion interposed between the electromagnetic pump of the hydraulic control device and the starting engagement element can be reduced.

Further, the power transmission device according to the present disclosure may further include a switching valve that forms, when the starting engagement element is to be engaged, a first state when the first pump is operated, and a second state when the first pump is not operated, the first state being a state in which the hydraulic oil discharged from the first pump and regulated is supplied to the starting engagement element, the second state being a state in which the hydraulic oil discharged from the second pump is supplied to the starting engagement element.

DETAILED DESCRIPTION OF EMBODIMENTS

Hereinafter, a mode for carrying out the disclosure will be described based on an embodiment.

Figure 1:
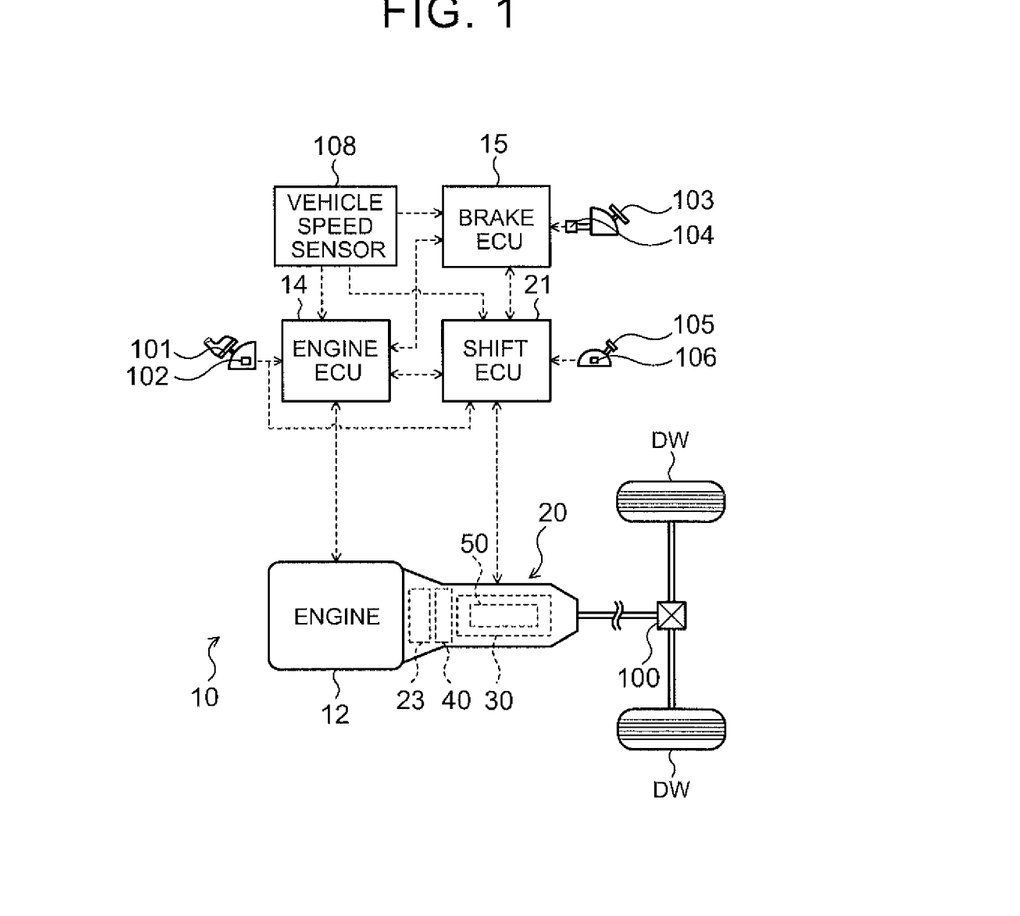
FIG. 1 is a block diagram schematically illustrating the configuration of an automobile on which a power transmission device according to an embodiment of the present disclosure is mounted.
Figure 2:
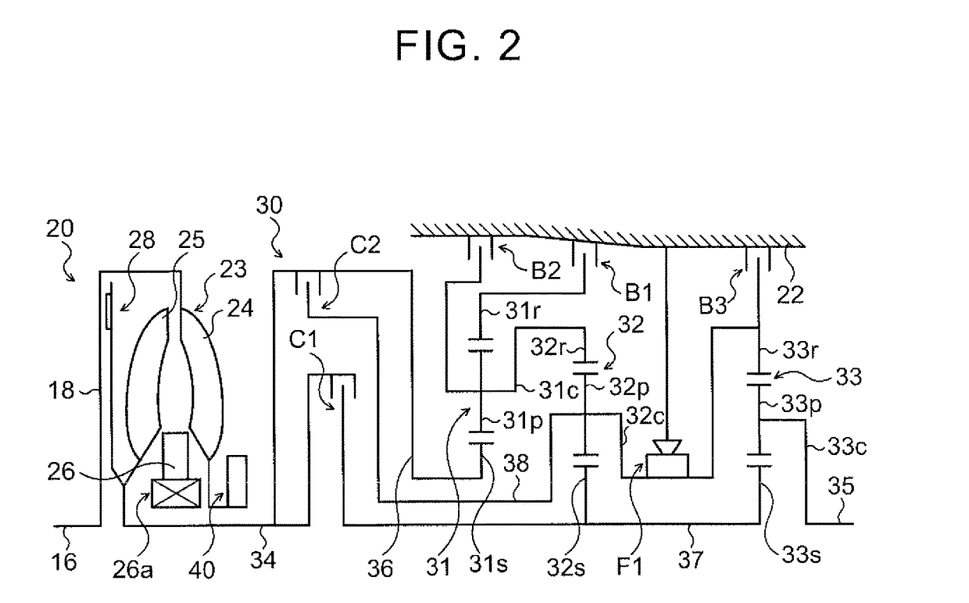
FIG. 2 is a block diagram schematically illustrating the configuration of the power transmission device.
Figure 3:
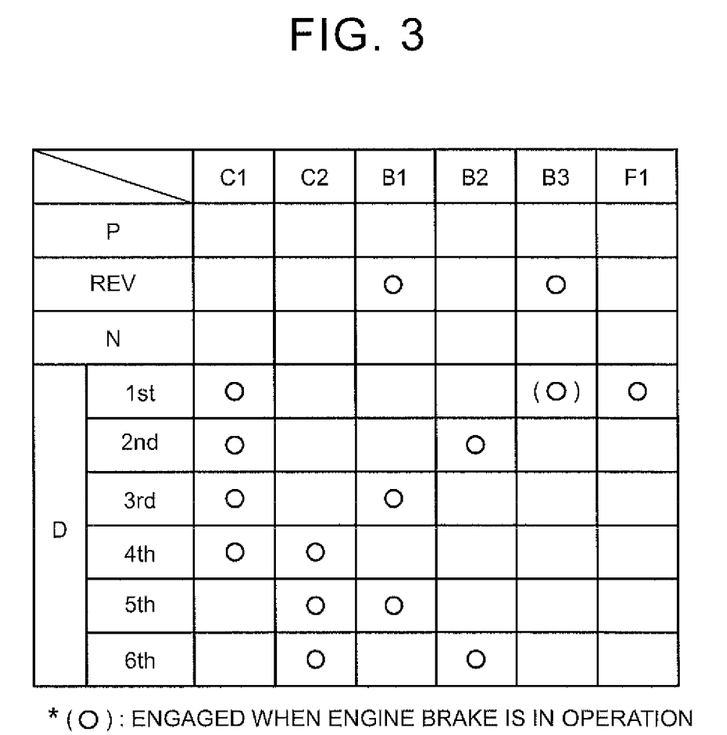
FIG. 3 is an explanatory diagram illustrating an operation table that shows the relationships between the shift speeds of a transmission and the operational states of clutches and brakes.
Figure 4:
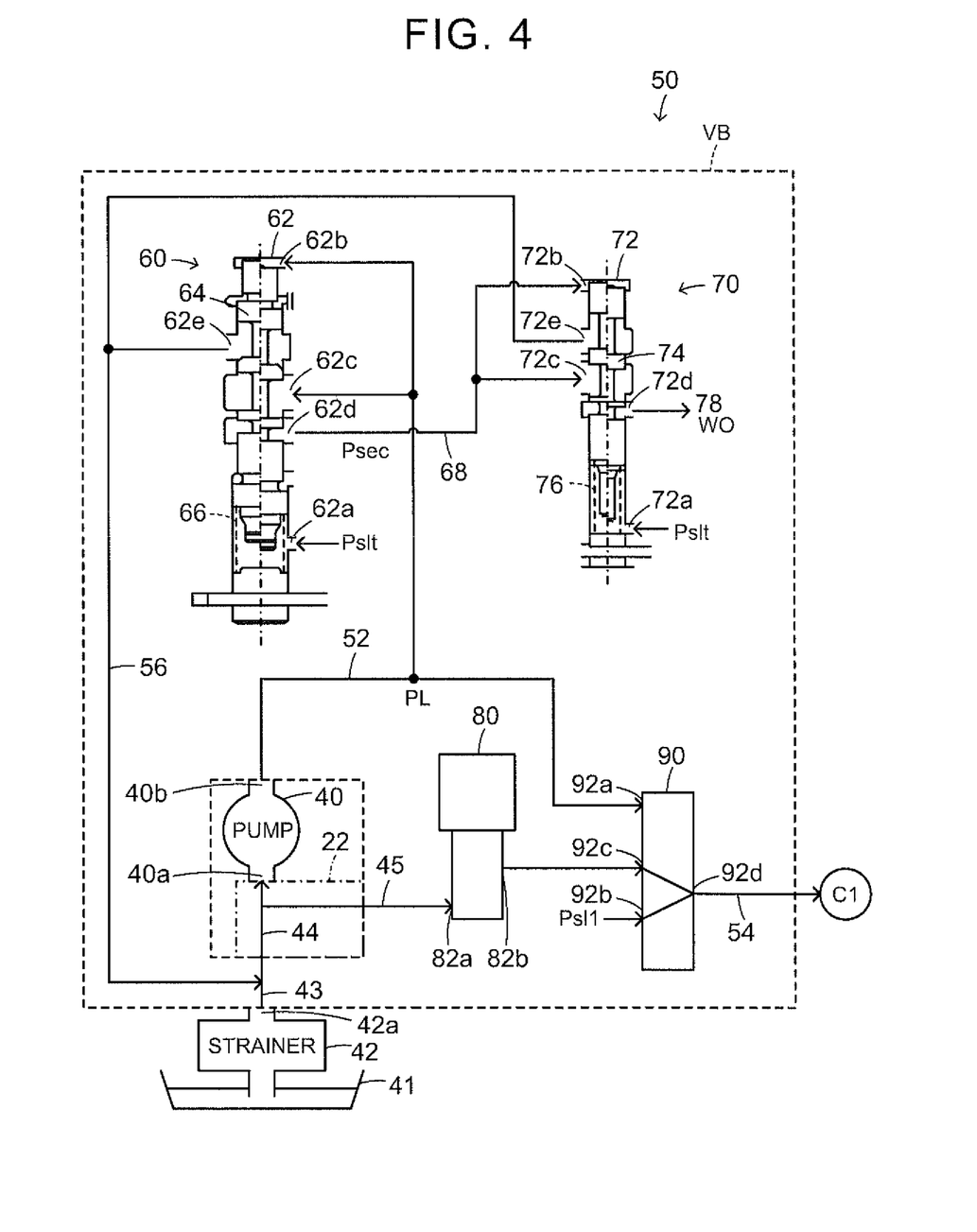
FIG. 4 is a block diagram schematically illustrating the configuration of a hydraulic oil storing portion, a strainer, an oil pump, a hydraulic control device, and the surrounding area.

FIG. 1 is a block diagram schematically illustrating the configuration of an automobile 10 on which a power transmission device 20 according to an embodiment of the present disclosure is mounted. FIG. 2 is a block diagram schematically illustrating the configuration of the power transmission device 20. FIG. 3 is an explanatory diagram illustrating an operation table that shows the relationships between the shift speeds of a transmission 30 and the operational states of clutches C1 and C2 and brakes B1 through B3. FIG. 4 is a block diagram schematically illustrating the configuration of a hydraulic oil storing portion 41, a strainer 42, an oil pump 40, a hydraulic control device 50, and the surrounding area.

The automobile 10 of the embodiment is configured as a rear-wheel-drive vehicle. As illustrated in FIG. 1, the automobile 10 includes an engine 12 that serves as a motor; an engine electronic control unit (hereinafter "engine ECU") 14 that controls the engine 12; a brake electronic control unit (hereinafter "brake ECU") 15 that controls an electronically controlled hydraulic brake unit (not illustrated); and the power transmission device 20 that transmits power from the engine 12 to drive wheels (rear wheels) DW through a differential gear 100.

Figure 5:
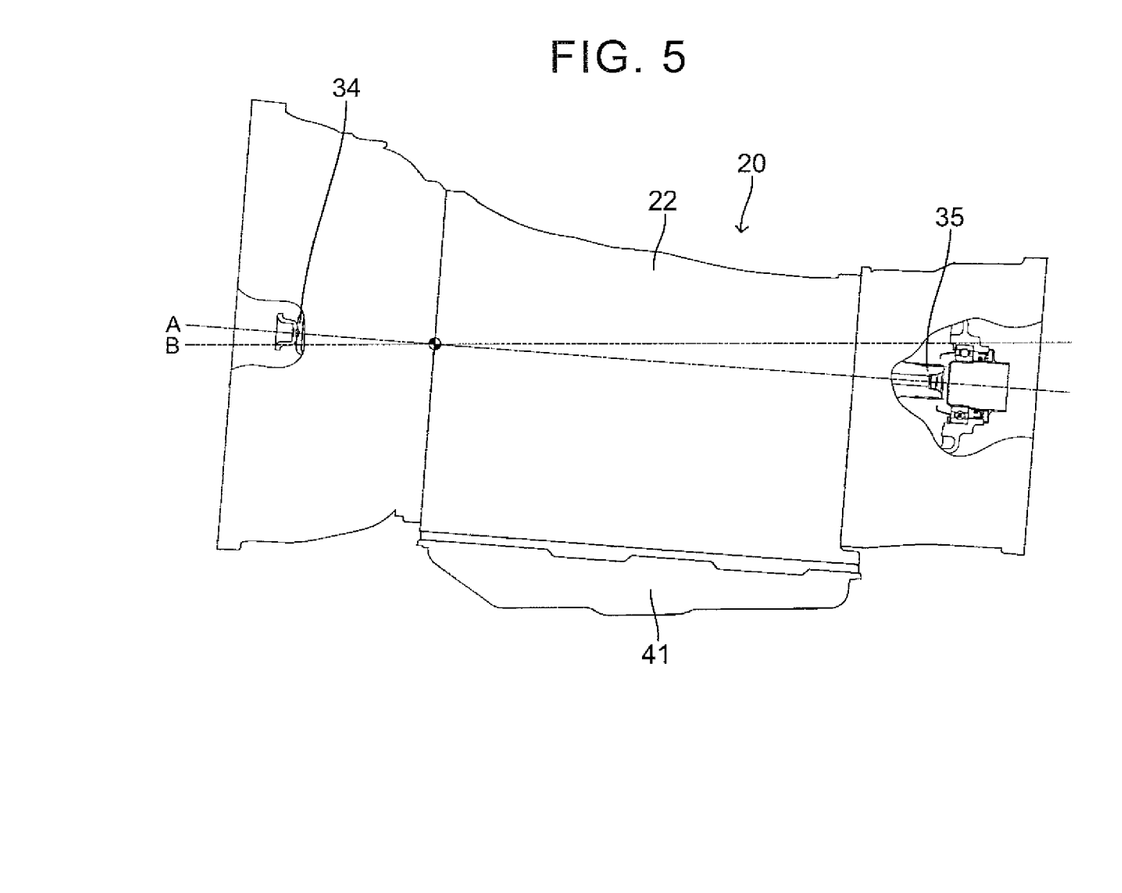
FIG. 5 is an explanatory diagram illustrating the power transmission device mounted on the automobile.

The power transmission device 20 includes a fluid transmission device 23; the stepped transmission 30; the oil pump 40 that serves as a hydraulic pressure generating source for the fluid transmission device 23 and the transmission 30; the hydraulic control device 50 that supplies and discharges hydraulic oil to and from the fluid transmission device 23 and the transmission 30; a transmission case 22 that accommodates these components; and a shift electronic control unit (hereinafter "shift ECU") 21 that controls the entire device. FIG. 5 is an explanatory diagram illustrating the power transmission device 20 mounted on the automobile 10. In FIG. 5, a one-dot chain line A indicates the horizontal direction in the single power transmission device 20, more specifically, the horizontal direction along center axes of an input shaft 34 and an output shaft 35, and a two-dot chain line B indicates the horizontal direction in the automobile 10, more specifically, the horizontal direction with respect to the ground. As illustrated in FIG. 5, the power transmission device 20 is mounted on the automobile 10 configured as a rear-wheel-drive vehicle such that the vehicle rear side thereof is disposed lower than the vehicle front side thereof.

The engine ECU 14 receives inputs such as the accelerator operation amount from an accelerator pedal position sensor 102 that detects the depression amount of an accelerator pedal 101, and the vehicle speed from a vehicle speed sensor 108 that detects the vehicle speed. The brake ECU 15 receives inputs such as a brake switch signal from a brake switch 104 that detects depression of a brake pedal 103, and the vehicle speed from the vehicle speed sensor 108. The shift ECU 21 receives inputs such as the accelerator operation amount from the accelerator pedal position sensor 102, a shift position SP from a shift position sensor 106 that detects the position of a shift lever 105, and the vehicle speed from the vehicle speed sensor 108. The engine ECU 14, the brake ECU 15, and the shift ECU 21 are connected through communication ports, and exchange various control signals and data with each other.

The fluid transmission device 23 is configured as a fluid torque converter. As illustrated in FIG. 2, the fluid transmission device 23 includes a pump impeller 24 that is connected to a crankshaft 16 of the engine 12 via a front cover 18; a turbine runner 25 that is connected to the input shaft 34 of the transmission 30 via a turbine hub; a stator 26 that is disposed inward of the pump impeller 24 and the turbine runner 25 and rectifies the flow of hydraulic oil (ATF) from the turbine runner 25 to the pump impeller 24; a one-way clutch 26a that restricts the rotation of the stator 26 to one direction; a damper mechanism (not illustrated); and a lock-up clutch 28. Note that the fluid transmission device 23 may be configured as a fluid coupling that does not include the stator 26.

The transmission 30 is configured as a six-speed transmission, and includes a first planetary gear mechanism 31, a second planetary gear mechanism 32, and a third planetary gear mechanism 33, all of which are single-pinion type planetary gears; the input shaft 34; the output shaft 35; and two clutches C1 and C2, three brakes B1, B2, and B3, and a one-way clutch F1 for changing the power transmission path from the input shaft 34 to the output shaft 35. The first through third planetary gear mechanisms 31 through 33, the clutches C1 and C2, the brakes B1 through B3, and the one-way clutch F1 are accommodated in the transmission case 22. The input shaft 34 of the transmission 30 is coupled to the crankshaft 16 of the engine 12 via the fluid transmission device 23. The output shaft 35 is coupled to the drive wheels DW via a differential mechanism (differential gear).

The first planetary gear mechanism 31 is disposed closest to the engine (the front of the vehicle), that is, closest to the input shaft 34, among the first through third planetary gear mechanisms 31 through 33, and forms a speed change gear mechanism together with the downstream second planetary gear mechanism 32. The first planetary gear mechanism 31 includes a first sun gear 31s that is an external gear; a first ring gear 31r that serves as a fixable element and is an internal gear disposed concentrically with the first sun gear 31s; and a first carrier 31c that rotatably and revolvably supports a plurality of first pinion gears 31p that mesh with the first sun gear 31s and mesh with the first ring gear 31n The first sun gear 31s of the first planetary gear mechanism 31 is fixed to an annular coupling drum 36 that is coupled to (in spline engagement with) a clutch drum of the clutch C1, which can rotate together with the input shaft 34.

The second planetary gear mechanism 32 is disposed to be aligned with the first planetary gear mechanism 31 on the output shaft 35 side thereof (the vehicle rear side). The second planetary gear mechanism 32 includes a second sun gear 32s that is an external gear; a second ring gear 32r that serves as a fixable element and is an internal gear disposed concentrically with the second sun gear 32s; and a second carrier 32c that rotatably and revolvably supports a plurality of second pinion gears 32p that mesh with the second sun gear 32s and mesh with the second ring gear 32r. The second sun gear 32s of the second planetary gear mechanism 32 is fixed to a hollow intermediate shaft 37 that is rotatably disposed between the input shaft 34 and the output shaft 35. The second ring gear 32r of the second planetary gear mechanism 32 is coupled to the first carrier 31c of the first planetary gear mechanism 31. The second carrier 32c of the second planetary gear mechanism 32 is fixed to a sleeve 38 that is coaxially and rotatably supported by the intermediate shaft 37.

The third planetary gear mechanism 33 is disposed closest to the output shaft 35 (the vehicle rear side) among the first through third planetary gear mechanisms 31 through 33, and serves as a reduction gear mechanism. The third planetary gear mechanism 33 includes a third sun gear 33s that is an external gear; a third ring gear 33r that serves as a fixable element and is an internal gear disposed concentrically with the third sun gear 33s; and a third carrier 33c that rotatably and revolvably supports a plurality of third pinion gears 33p that mesh with the third sun gear 33s and mesh with the third ring gear 33r. The third sun gear 33s of the third planetary gear mechanism 33 is fixed to the intermediate shaft 37 and coupled to the second sun gear 32s of the second planetary gear mechanism 32. The third ring gear 33r of the third planetary gear mechanism 33 is coupled to the second carrier 32c of the second planetary gear mechanism 32. The third carrier 33c of the third planetary gear mechanism 33 is coupled to the output shaft 35.

The clutch C1 is a multi-plate hydraulic clutch that can couple and uncouple the input shaft 34 and the intermediate shaft 37, that is, the second sun gear 32s of the second planetary gear mechanism 32 and the third sun gear 33s of the third planetary gear mechanism 33. The clutch C2 is a multi-plate hydraulic clutch that can couple and uncouple the input shaft 34 and the sleeve 38, that is, the second carrier 32c of the second planetary gear mechanism 32. The one-way clutch F1 allows only positive rotation of the second carrier 32c of the second planetary gear mechanism 32 and the third ring gear 33r of the third planetary gear mechanism 33, and restricts reverse rotation thereof.

The brake B1 is a multi-plate hydraulic brake that can hold the first ring gear 31r of the first planetary gear mechanism 31 stationary to the transmission case 22 and release the first ring gear 31r held stationary to the transmission case 22. The brake B2 is a multi-plate hydraulic brake that can hold the first carrier 31c of the first planetary gear mechanism 31 stationary to the transmission case 22 so as to hold the second ring gear 32r of the second planetary gear mechanism 32 stationary to the transmission case 22, and release the first carrier 31c and the second ring gear 32r held stationary to the transmission case 22. The brake B3 is a multi-plate hydraulic brake that can hold the second carrier 32c of the second planetary gear mechanism 32 and the third ring gear 33r of the third planetary gear mechanism 33 stationary to the transmission case 22, and release the second carrier 32c and the third ring gear 33r held stationary to the transmission case 22.

The clutches C1 and C2 and the brakes B1 through B3 are operated through the supply and discharge of hydraulic oil by the hydraulic control device 50. The transmission 30 sets the clutches C1 and C2 and the brakes B1 through B3 to the states shown in the operation table of FIG. 3 so as to provide first through sixth forward speeds and one reverse speed.

The oil pump 40 is configured as a gear pump, and includes a pump assembly including a pump body and a pump cover; and an external gear connected to the pump impeller 24 of the fluid transmission device 23 via a hub. The oil pump 40 is operated by power from the engine 12. As illustrated in FIG. 4, the oil pump 40 suctions hydraulic oil stored in the hydraulic oil storing portion 41 via the strainer 42, an oil passage 43 formed in a valve body VB of the hydraulic control device 50, an oil passage 44 formed in the transmission case 22, and a suction port 40a formed in the pump assembly, increases the pressure of the hydraulic oil, and supplies the hydraulic oil with an increased pressure to an oil passage 52 of the hydraulic control device 50 via a discharge port 40b formed in the pump assembly.

The hydraulic control device 50 includes a primary regulator valve 60, a secondary regulator valve 70, a modulator valve (not illustrated), a linear solenoid valve SLT (not illustrated), a manual valve MV (not illustrated), a linear solenoid valve SLC1 (not illustrated), an electromagnetic pump 80, and a switching valve 90. The primary regulator valve 60 regulates the pressure of the hydraulic oil supplied from the oil pump 40 to the oil passage 52 so as to generate line pressure PL, and discharges at least part of the hydraulic oil to an oil passage 68 in association with generation of the line pressure PL. The secondary regulator valve 70 regulates the pressure of the hydraulic oil discharged from the primary regulator valve 60 to the oil passage 68 so as to generate secondary pressure Psec, and discharges at least part of the hydraulic oil to a lubricating oil passage (LUBE) 78 in association with generation of the secondary pressure Psec. The modulator valve generates constant modulator pressure Pmod from the line pressure PL serving as the source pressure. The linear solenoid valve SLT generates hydraulic pressure Pslt from the modulator pressure Pmod serving as the source pressure in accordance with the accelerator operation amount and the throttle opening, and outputs the generated hydraulic pressure Pslt as a signal pressure to the primary regulator valve 60 and the secondary regulator valve 70 so as to drive the primary regulator valve 60 and the secondary regulator valve 70. The manual valve MV has an input port to which the line pressure PL is input, a D (drive) position output port, an R (reverse) position output port, and so on. The manual valve MV opens and closes each port in conjunction with the operation of the shift lever 105. The linear solenoid valve SLC1 receives, via an input port, hydraulic oil output from the D position output port of the manual valve MV, regulates the pressure of the received hydraulic oil by discharging the hydraulic oil from a drain port, and outputs the hydraulic oil from an output port. The electromagnetic pump 80 suctions the hydraulic oil from the above-described oil passage 44 formed in the transmission case 22 through an oil passage 45 formed in the valve body VB, and discharges the hydraulic oil with an increased pressure. The switching valve 90 switches between a first state and a second state. In the first state, hydraulic oil (hydraulic pressure Pslt) discharged from the linear solenoid valve SLC1 is supplied to an oil passage 54 of the clutch C1, and hydraulic oil discharged from the electromagnetic pump 80 is supplied to the lubricating oil passage 78. In the second state, the supply of hydraulic oil from the linear solenoid valve SLC1 to the oil passage 54 is cut off, and hydraulic oil from the electromagnetic pump 80 is supplied to the oil passage 54 of the clutch C1. The hydraulic oil supplied to the lubricating oil passage 78 is supplied to and lubricates the mechanical components such as the gears of the first through third planetary gear mechanisms 31 through 33, the clutches C1 and C2, the brakes B1 through B3, the differential gear 100, and the bearings for rotatably supporting the respective rotating shafts. Then, the hydraulic oil returns again to the hydraulic oil storing portion 41. Note that FIG. 4 only shows the hydraulic system of the clutch C1, and does not show the hydraulic systems such as the clutch C2, the brakes B1 through B3, and the lock-up clutch 28 of the fluid transmission device 23 because these hydraulic systems are not central to the present disclosure. These hydraulic systems may be configured using well-known linear solenoid valves or the like.

The primary regulator valve 60 includes a sleeve 62, a spool 64 that slides inside the sleeve 62 in the axial direction, and a spring 66 that biases the spool 64 axially upward in the figure. The sleeve 62 has various ports, namely, a signal pressure input port 62a that receives an input of the hydraulic pressure Pslt as a signal pressure from the linear solenoid valve SLT, a feedback input port 62b that is connected to the oil passage 52 extending from the oil pump 40 and receives an input of the line pressure PL as a feedback pressure, an input port 62c that is connected to the oil passage 52, an output port 62d that is connected to the oil passage 68 extending to the secondary regulator valve 70, and a drain port 62e that is connected to an oil passage 56 communicating with the oil passage 43 connected to an outlet 42a of the strainer 42. In the primary regulator valve 60, the oil amount output from the input port 62c to the oil passage 68 via the output port 62d is increased as the spool 64 moves downward in the figure. When the spool 64 moves further downward, hydraulic oil is drained from the input port 62c to the oil passage 56 via the drain port 62e, thereby reducing the hydraulic pressure from the oil pump 40 and adjusting the line pressure PL. The spool 64 is biased upward in the figure by the spring force of the spring 66 and the hydraulic pressure applied to the signal pressure input port 62a, and is also biased downward in the figure by the line pressure PL applied to the feedback input port 62b. Therefore, the line pressure PL increases as the hydraulic pressure Pslt applied to the signal pressure input port 62a increases. Note that the hydraulic oil drained from the drain port 62e to the oil passage 56 returns to the oil passage 43.

The secondary regulator valve 70 includes a sleeve 72, a spool 74 that slides inside the sleeve 72 in the axial direction, and a spring 76 that biases the spool 74 axially upward in the figure. The sleeve 72 has various ports, namely, a signal pressure input port 72a that receives an input of the hydraulic pressure Pslt as a signal pressure from the linear solenoid valve SLT, a feedback input port 72b that is connected to the oil passage 68 extending from the primary regulator valve 60 and receives an input of the secondary pressure Psec as a feedback pressure, an input port 72c that is connected to the oil passage 68, an output port 72d that is connected to the lubricating oil passage 78, and a drain port 72e that is connected to the oil passage 56 communicating with the oil passage 43. In the secondary regulator valve 70, as the spool 74 moves downward in the figure, the oil amount output from the input port 72c to the lubricating oil passage 78 via the output port 72d is increased. When the spool 74 moves further downward, hydraulic oil is drained from the input port 72c to the oil passage 56 via the drain port 72e, thereby reducing the hydraulic pressure from the primary regulator valve 60 and adjusting the secondary pressure Psec. The spool 74 is biased upward in the figure by the spring force of the spring 76 and the hydraulic pressure applied to the signal pressure input port 72a, and is also biased downward in the figure by the secondary pressure Psec applied to the feedback input port 72b. Therefore, the secondary pressure Psec increases as the hydraulic pressure Pslt applied to the signal pressure input port 72a increases. Note that the hydraulic oil drained from the drain port 72e to the oil passage 56 returns to the oil passage 43.

Although not illustrated in detail in the drawings, the electromagnetic pump 80 includes an electromagnetic portion that generates an electromagnetic force by energization of a coil; a hollow cylindrical cylinder having a suction port 82a for suctioning hydraulic oil from the oil passage 45 and a discharge port 82b for discharging the hydraulic oil; a cylindrical piston that slides inside the cylinder by being pressed by the electromagnetic force from the electromagnetic portion; a spring that biases the piston in the direction opposite to the direction in which the piston is pressed by the electromagnetic force: a suction check valve that is disposed in the cylinder so as to allow inflow of the hydraulic oil from the suction port 82a and prohibit outflow of the hydraulic oil in the opposite direction; and a discharge check valve that is disposed in the piston so as to allow outflow of the hydraulic oil to the discharge port 82b and prohibit inflow of the hydraulic oil in the opposite direction. In the electromagnetic pump 80, the piston is reciprocated by intermittent energization of the coil, thereby increasing the pressure of the hydraulic oil suctioned from the suction port 82a and discharging the hydraulic oil from the discharge port 82b.

Although not illustrated in detail in the drawings, the switching valve 90 includes a sleeve, a spool that slides inside the sleeve in the axial direction, and a spring that biases the spool in the axial direction. The sleeve has various ports, namely, a signal pressure input port 92a that receives an input of the line pressure PL as a signal pressure, a first input port 92b that is connected to the output port of the linear solenoid valve SLC1, a second input port 92c that is connected to the discharge port 82b of the electromagnetic pump 80, and a first output port 92d that is connected to the oil passage 54 of the clutch C1. When the line pressure PL is input to the signal pressure input port 92a, the switching valve 90 cuts off communication between the second input port 92c and the first output port 92d, and establishes communication between the first input port 92b and the first output port 92d. Thus, communication between the output port of the linear solenoid valve SLC1 and the oil passage 54 of the clutch C1 is established, and communication between the discharge port 82b of the electromagnetic pump 80 and the oil passage 54 of the clutch C1 is cut off. On the other hand, when the line pressure PL is not input to the signal pressure input port 72a, the switching valve 90 cuts off communication between the first input port 92b and the first output port 92d, and establishes communication between the second input port 92c and the first output port 92d. Thus, communication between the output port of the linear solenoid valve SLC1 and the oil passage 54 of the clutch C1 is cut off, and communication between the discharge port 82b of the electromagnetic pump 80 and the oil passage 54 of the clutch C1 is established.

When the automobile 10 configured as described above travels with the shift lever 105 in the D (drive) position, the shift ECU 21 sets a target shift speed using a shift map based on the acceleration operation amount from the accelerator pedal position sensor 102 and the vehicle speed from the vehicle speed sensor 108, and drivingly controls the hydraulic control device 50 (the linear solenoid valve SLT, the linear solenoid valve SLC1, and so on) so as to engage and disengage the clutches C1 and C2 and the brakes B1 through B3 based on the set target shift speed.

While the engine 12 is in operation, the oil pump 40 is operated by power from the engine 12, and the line pressure FL is generated by the primary regulator valve 60. Thus, the switching valve 90 establishes communication between the output port of the linear solenoid valve SLC1 and the oil passage 54 of the clutch C1, and cuts off communication between the discharge port 82b of the electromagnetic pump 80 and the oil passage 54 of the clutch C1. Accordingly, when the clutch C1 needs to be engaged in accordance with the target shift speed, the clutch C1 can be engaged by applying the hydraulic pressure Pslt from the linear solenoid valve SLC1 to the clutch C1.

Further, when the automobile 10 of the embodiment travels with the shift lever 105 in the D (drive) position, the engine 12 automatically stops if all the predetermined automatic stop conditions are satisfied. The automatic stop conditions include the value of the vehicle speed V being 0, the accelerator being off, and the brake switch signal being on. After the engine 12 automatically stops, if a predetermined automatic start condition is satisfied, the engine 12 automatically starts. The automatic start condition includes the brake switch signal being off.

While the engine 12 has automatically stopped, the electromagnetic pump 80 is operated so as to increase the pressure of the hydraulic oil suctioned from the suction port 82a and discharge the hydraulic oil from the discharge port 82b (pressure-feed the hydraulic oil toward the switching valve 90). Here, a case will be considered in which the engine 12 automatically stops after the automatic stop conditions are satisfied. In this case, the oil pump 40 is stopped, so that the line pressure PL decreases. Thus, the switching valve 90 cuts off communication between the output port of the linear solenoid valve SLC1 and the oil passage 54 of the clutch C1, and establishes communication between the discharge port 82b of the electromagnetic pump 80 and the oil passage 54 of the clutch C1. Accordingly, by pressure-feeding the hydraulic oil by the electromagnetic pump 80, it is possible to apply hydraulic pressure to the clutch C1 to be engaged when starting the vehicle. Subsequently, when the automatic start condition is satisfied and the engine 12 automatically starts, the oil pump 40 is operated, so that the line pressure PL is supplied. Thus, the switching valve 90 establishes communication between the output port of the linear solenoid valve SLC1 and the oil passage 54 of the clutch C1, and cuts off communication between the discharge port 82b of the electromagnetic pump 80 and the oil passage 54 of the clutch C1 Then, by applying the hydraulic pressure Psl1 from the linear solenoid valve SLC1 to the clutch C1, the clutch C1 is completely engaged, so that the vehicle can start. By driving the electromagnetic pump 80 such that the hydraulic pressure is applied to the clutch C1 while the engine 12 has automatically stopped, the clutch C1 can be quickly engaged by the hydraulic pressure from the linear solenoid valve SLC1 immediately after the engine 12 automatically starts. Therefore, the vehicle can smoothly start upon automatic start of the engine 12.

Figure 7:
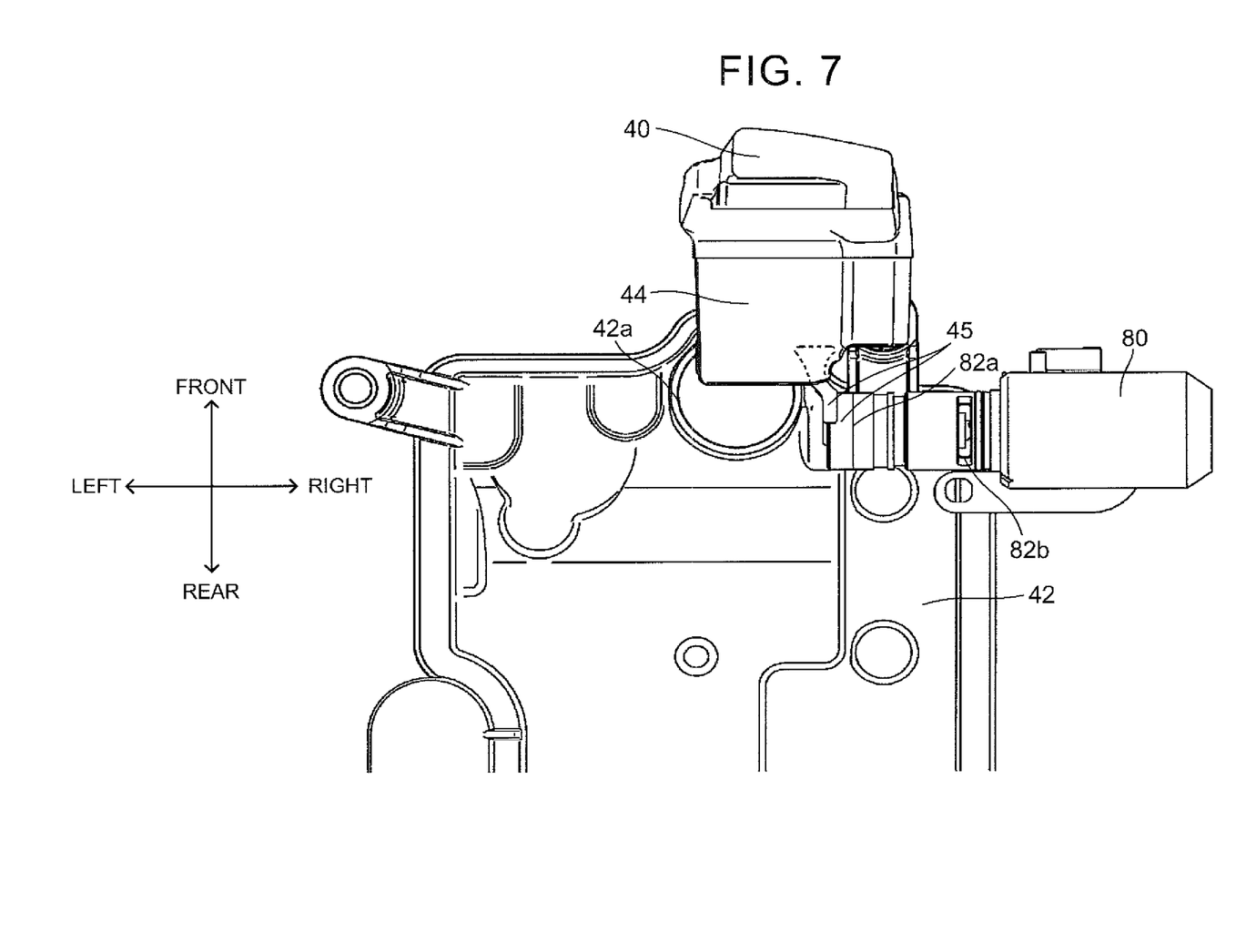
FIG. 7 is a layout drawing illustrating the strainer, the oil pump, the electromagnetic pump, and the surrounding area as seen from the upper side of the vehicle.
Figure 8:
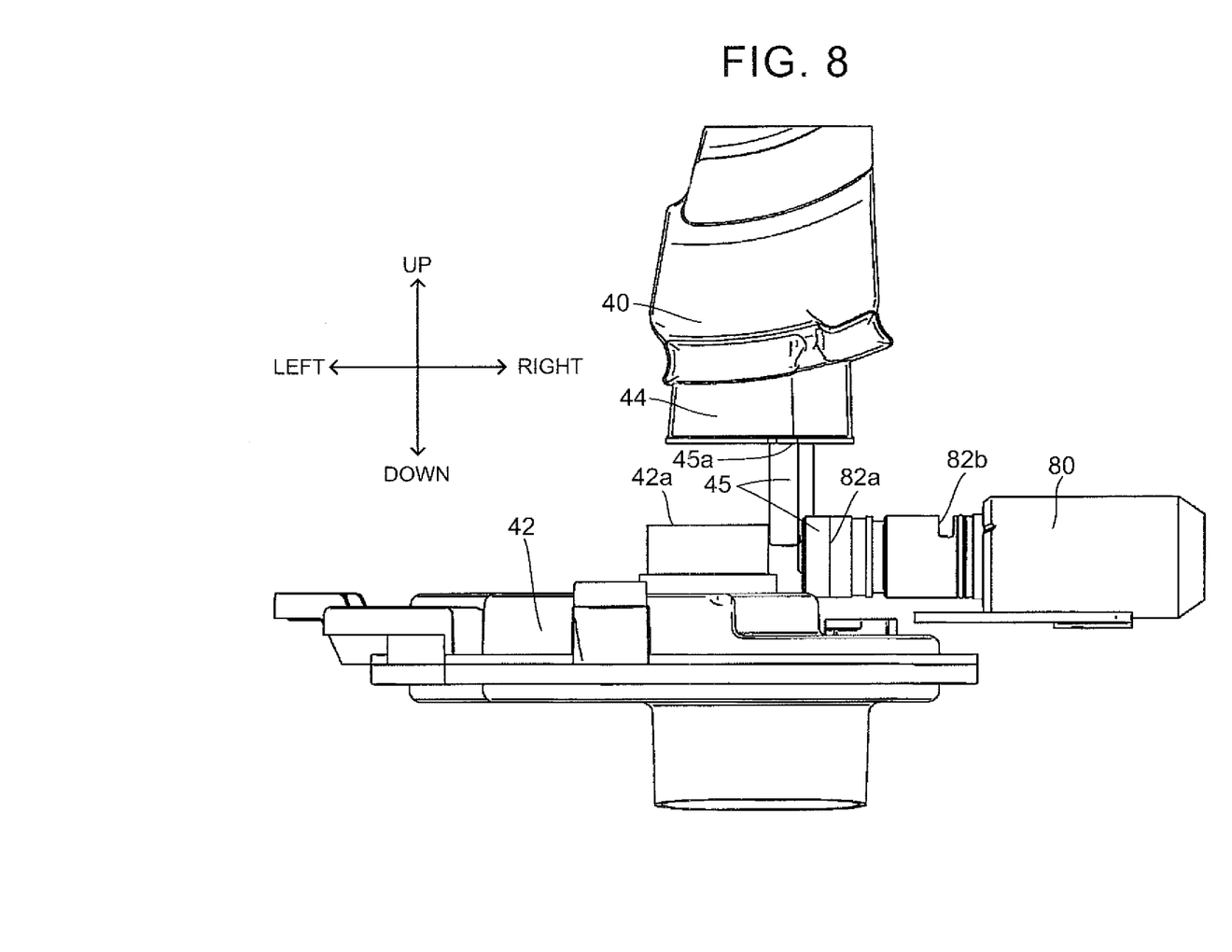
FIG. 8 is a layout drawing illustrating the strainer, the oil pump, the electromagnetic pump, and the surrounding area as seen from the rear side of the vehicle.
Figure 9:
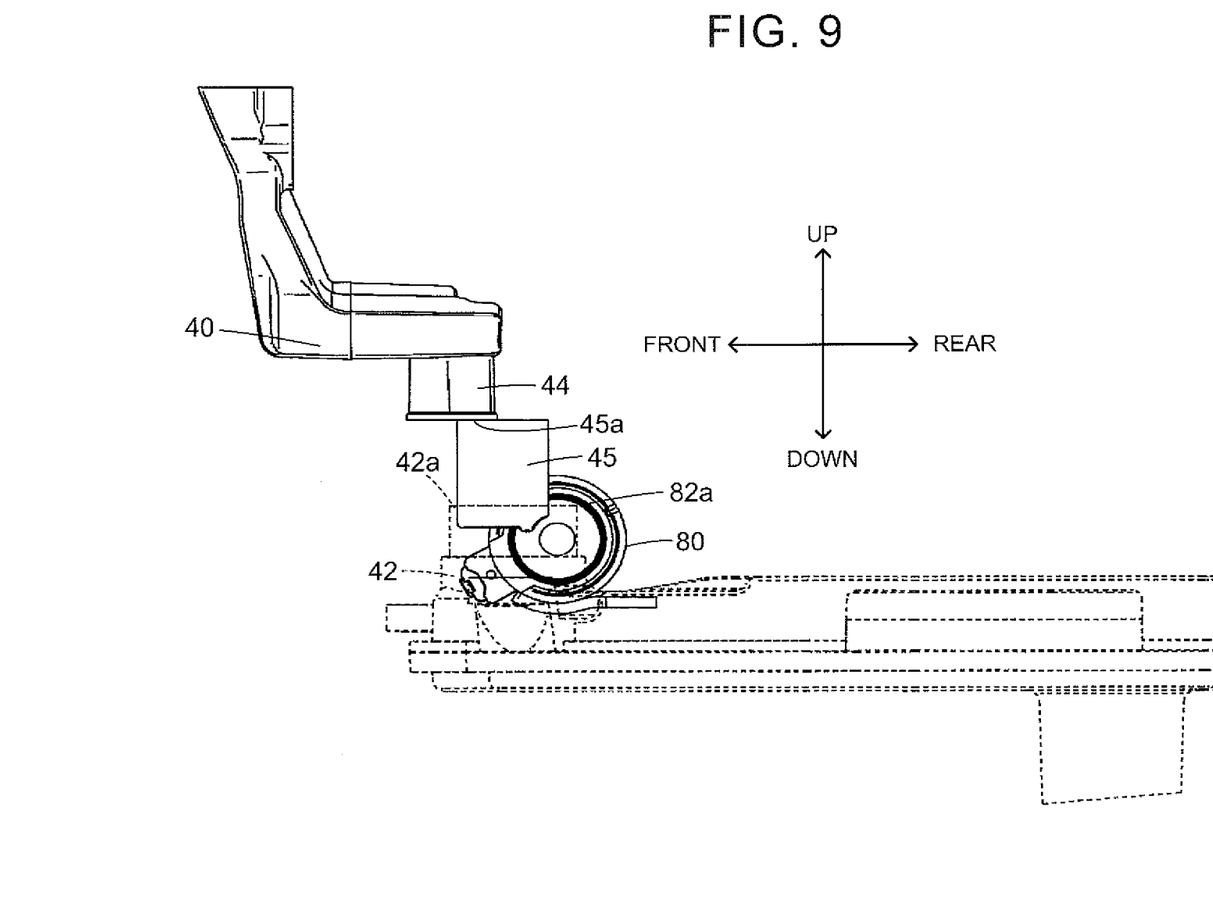
FIG. 9 is a layout drawing illustrating the strainer, the oil pump, the electromagnetic pump, and the surrounding area as seen from the left side of the vehicle.

Next, the layout of the strainer 42, the oil pump 40, the electromagnetic pump 80, and the surrounding area will be described. FIGS. 6 through 9 are layout drawings illustrating the strainer 42, the oil pump 40, the electromagnetic pump 80, and the surrounding area as seen from the upper right rear side, the upper side, the rear side, and the left side of the vehicle, respectively. In FIGS. 7 through 9, the oil passage 43 is omitted for clarity of illustration.

As illustrated in FIGS. 6 through 9, the electromagnetic pump 80 is disposed such that a spool (not illustrated) moves in the vehicle left-right direction (such that the suction port 82a and the discharge port 82b are aligned in the vehicle left-right direction), and is mounted on the valve body VB (not illustrated in FIGS. 6 through 9). The reason why the electromagnetic pump 80 is disposed such that the spool moves in the vehicle left-right direction is to suppress, during acceleration and deceleration of the vehicle, a difficulty in sliding of the spool due to application of the force (load) resulting from acceleration and deceleration to the electromagnetic pump 80. Further, the reason why the electromagnetic pump 80 is mounted on the valve body VB is to reduce the distance between the discharge port 82b of the electromagnetic pump 80 and a portion (the switching valve 90 and so on) interposed between the electromagnetic pump 80 of the hydraulic control device 50 and the clutch C1.

Figure 6:
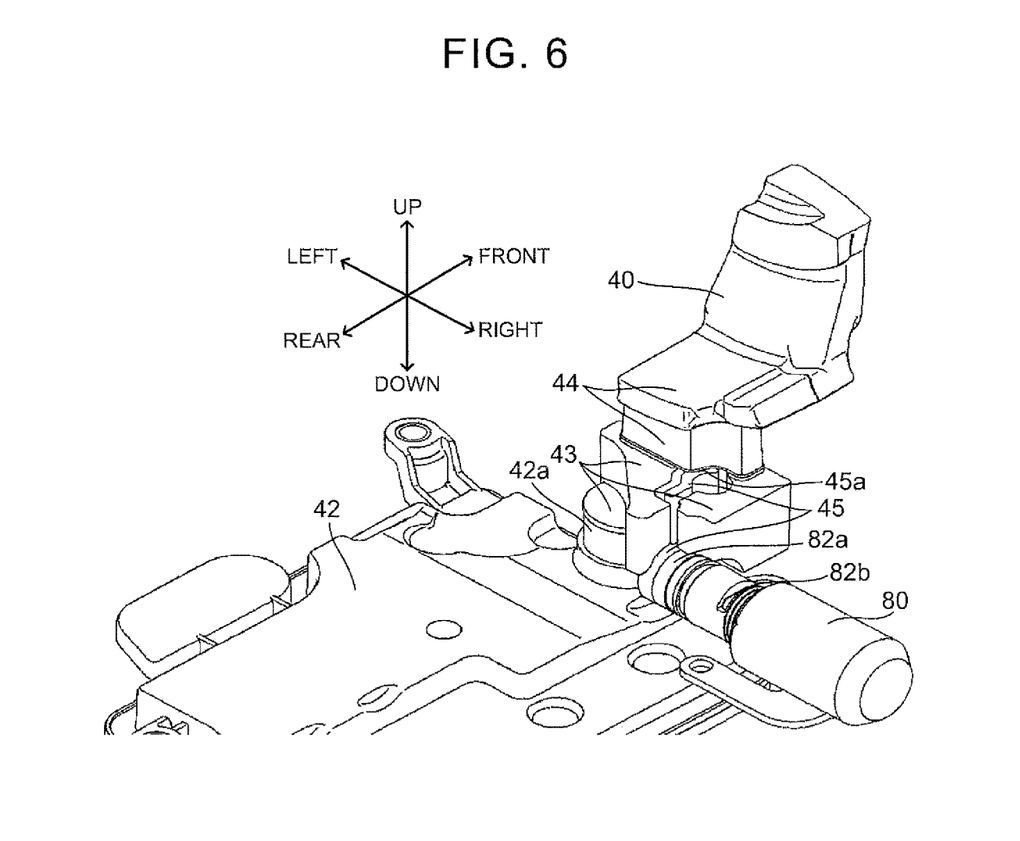
FIG. 6 is a layout drawing illustrating the strainer, the oil pump, an electromagnetic pump, and the surrounding area as seen from the upper right rear side of the vehicle.

Further, as illustrated in FIGS. 6 and 9, the outlet 42a of the strainer 42, the oil passage 43 formed in the valve body VB, and the oil passage 44 formed in the transmission case 22 are arranged in this order from the lower side of the vehicle. Furthermore, as illustrated in FIGS. 6 through 9, the outlet 42a of the strainer 42 and the oil passage 44 are located such that the distance therebetween is relatively short in the vehicle front-rear direction and the vehicle left-right direction. This is to allow the oil pump 40 to easily suction the hydraulic oil stored in the hydraulic oil storing portion 41 via the strainer 42, the oil passages 43 and 44, and the suction port 40a.

Further, as illustrated in FIGS. 6 and 9, the oil passage 44, the oil passage 45 formed in the valve body VB, and the suction port 82a of the electromagnetic pump 80 are arranged in this order from the upper side of the vehicle. That is, the oil passage 45 is formed toward the suction port 82a so as to extend downward with respect to the horizontal direction in the single power transmission device 20, throughout the whole oil passage 45 from a communication position 45a communicating with the oil passage 44. Furthermore, as described above, the power transmission device 20 is mounted on the automobile 10 configured as a rear-wheel-drive vehicle such that the vehicle rear side thereof is disposed lower than the vehicle front side thereof. Furthermore, as illustrated in FIGS. 6 through 9, the suction port 82a of the electromagnetic pump 80 is disposed at the lower side with respect to the communication position 45a of the oil passage 45 communicating with the oil passage 44 and at the vehicle rear side. Accordingly, with these arrangements, the oil passage 45 is formed toward the suction port 82a so as to extend downward with respect to the horizontal direction not only in the single power transmission device 20 but also in the power transmission device 20 mounted on the automobile 10, throughout the whole oil passage 45 from the communication position 45a.

Further, as illustrated in FIGS. 6 through 8, the suction port 82a of the electromagnetic pump 80 overlaps the oil passage 45 in the vehicle up-down direction as seen from the vehicle front-rear direction. Furthermore, as illustrated in FIGS. 6, 7, and 9, the suction port 82a of the electromagnetic pump 80 overlaps the outlet 42a of the strainer 42 as seen from the vehicle left-right direction. Accordingly, the distance between the oil passage 44 and the suction port 82a of the electromagnetic pump 80 in the vehicle front-rear direction and the vehicle left-right direction can be reduced. In particular, in the embodiment, the distance between the oil passage 44 and the suction port 82a of the electromagnetic pump 80 in the vehicle left-right direction can be further reduced (reduced to substantially zero).

Here, a case will be considered in which the engine 12 automatically stops after the automatic stop conditions are satisfied, and hydraulic pressure is applied to the clutch C1 by driving the electromagnetic pump 80 so as to be ready for the subsequent start of the vehicle. In an automobile having a configuration similar to that of the embodiment, that is, an automobile including a strainer 42, an oil pump 40, an electromagnetic pump 80, and oil passages 43, 44, and 45, air is often accumulated in the upper part of each of the oil passages 43 and 44 (in particular, the oil passage 44). Then, if the automobile 10 is inclined in the vehicle front-rear direction or the vehicle left-right direction, the air (accumulated air) may reach the oil passage 45. In the case where the oil passage 45 is long in the vehicle front-rear direction or the left-right direction, a relatively small inclination of the automobile 10 in the vehicle front-rear direction or the vehicle left-right direction may cause the air that has reached the upper part of the oil passage 45 to reach the suction port 82a of the electromagnetic pump 80, and thus the electromagnetic pump 80 may suction the air. If the electromagnetic pump 80 suctions the air, the hydraulic pressure to be applied from the electromagnetic pump 80 to the clutch C1 may be reduced (insufficient). Subsequently, when the engine 12 automatically starts and the clutch C1 is engaged by the hydraulic pressure from the linear solenoid valve SLC1, it may take time for engagement of the clutch C1, and the starting performance of the vehicle may be reduced. In particular, in the case where the electromagnetic pump 80 is used, unlike the case where an electric pump is used, it is difficult to discharge the suctioned air. Further, the electromagnetic pump 80 is often a relatively small pump, and therefore the discharge pressure is more likely to be reduced when air is suctioned. Because of these factors, it is necessary to further suppress suction of air by the electromagnetic pump 80.

On the other hand, in the embodiment, the oil passage 45 is formed toward the suction port 82a of the electromagnetic pump 80 so as to extend downward with respect to the horizontal direction in the single power transmission device 20 and in the automobile 10, throughout the whole oil passage 45 from the communication position 45a communicating with the oil passage 44. Further, the distance between the oil passage 44 and the suction port 82a of the electromagnetic pump 80 in the vehicle front-rear direction and the vehicle left-right direction is reduced. Thus, as long as the automobile 10 is not more greatly inclined in the vehicle front-rear direction or the vehicle left-right direction, the air accumulated (accumulated air) in the oil passage 44 is suppressed to reach the oil passage 45 and the suction port 82a of the electromagnetic pump 80, and suction of air is suppressed by the electromagnetic pump 80. In particular, in the embodiment, the distance between the oil passage 44 and the suction port 82a of the electromagnetic pump 80 is further reduced (reduced to substantially zero) in the vehicle left-right direction, as described above. This provides a greater effect with respect to inclination of the automobile 10 in the vehicle left-right direction. Thus, by suppressing suction of air by the electromagnetic pump 80, it is possible to suppress a reduction in the hydraulic pressure to be applied from the electromagnetic pump 80 to the clutch C1. Further, when the engine 12 automatically starts and the clutch C1 is engaged by the hydraulic pressure from the linear solenoid valve SLC1, it is possible to suppress an increase in time required for engagement of the clutch C1, and to suppress a reduction in the starting performance of the vehicle.

In the power transmission device 20 of the embodiment described above, the oil passage 45 that provides communication between the oil passage 44 and the electromagnetic pump 80 is formed toward the suction port 82a of the electromagnetic pump 80 so as to extend downward with respect to the horizontal direction in the single power transmission device 20 and in the automobile 10, throughout the whole oil passage 45 from the communication position 45a communicating with the oil passage 44. Further, the suction port 82a of the electromagnetic pump 80 is located at the lower side of the vehicle with respect to the oil passage 44, which is formed in the transmission case 22 and is interposed between the outlet 42a of the strainer 42 and the oil pump 40, and overlaps the oil passage 44 in the vehicle up-down direction, as seen from the vehicle front-rear direction. Furthermore, the suction port 82a overlaps the outlet 42a of the strainer 42 as seen from the vehicle left-right direction. Accordingly, the distance between the oil passage 44 and the suction port 82a of the electromagnetic pump 80 in the vehicle front-rear direction and the vehicle left-right direction can be reduced. Thus, even if air is accumulated in the upper part of the oil passage 44, as long as the automobile 10 is not more greatly inclined in the vehicle front-rear direction or the vehicle left-right direction, the air accumulated (accumulated air) in the oil passage 44 is suppressed to reach the oil passage 45 and the suction port 82a of the electromagnetic pump 80, and suction of air is suppressed by the electromagnetic pump 80. Accordingly, when the hydraulic pressure needs to be applied from the electromagnetic pump 80 to the clutch C1, it is possible to suppress a reduction in the hydraulic pressure to be applied from the electromagnetic pump 80 to the clutch C1. Further, when the engine 12 automatically starts and the clutch C1 is engaged by the hydraulic pressure from the linear solenoid valve SLC1, it is possible to suppress an increase in time required for engagement of the clutch C1, and to suppress a reduction in the starting performance of the vehicle.

In the power transmission device 20 of the embodiment, as illustrated in FIG. 9, the suction port 82a of the electromagnetic pump 80 overlaps the outlet 42a of the strainer 42 (does not overlap the oil passage 44 in the vehicle up-down direction) as seen from the vehicle left-right direction. However, the suction port 82a of the electromagnetic pump 80 may overlap the oil passage 44 in the vehicle up-down direction as seen from the vehicle left-right direction. In this case, the distance between the oil passage 44 and the suction port 82a of the electromagnetic pump 80 can be further reduced in the vehicle front-rear direction, which provides a greater effect with respect to inclination of the automobile 10 in the vehicle front-rear direction. Note that it is obvious that the suction port 82a of the electromagnetic pump 80 may be disposed so as to overlap the outlet 42a of the strainer 42, and to overlap the oil passage 44 in the vehicle up-down direction, as seen from the vehicle lateral direction. Further, in this case, the suction port 82a of the electromagnetic pump 80 may not overlap the oil passage 44 in the vehicle up-down direction as seen from the vehicle front-rear direction.

In the power transmission device 20 of the embodiment, the suction port 82a of the electromagnetic pump 80 is located at the lower side of the vehicle with respect to the oil passage 44 and overlaps the oil passage 44 in the vehicle up-down direction as seen from the vehicle front-rear direction, and overlaps the outlet 42a of the strainer 42 as seen from the vehicle left-right direction. However, as long as the oil passage 45 is formed toward the suction port 82a so as to extend downward with respect to the horizontal direction in the single power transmission device 20 and in the automobile 10, throughout the whole oil passage 45 from the communication position 45a communicating with the oil passage 44, the suction port 82a of the electromagnetic pump 80 may not overlap the oil passage 44 in the vehicle up-down direction as seen from the vehicle front-rear direction, and may not overlap the outlet 42a of the strainer 42 or overlap the oil passage 44 in the vehicle up-down direction, as seen from the vehicle left-right direction. In this case, the distance between the oil passage 44 and the suction port 82a of the electromagnetic pump 80 in the vehicle front-rear direction and the vehicle left-right direction is increased. However, compared to the case where the oil passage 45 is formed toward the suction port 82a so as to extend in the single horizontal direction in the power transmission device 20 and in the automobile 10 or upward with respect to the horizontal direction, from the communication position 45a communicating with the oil passage 44, when air is accumulated in the upper part of the oil passage 44, the air (accumulated air) is suppressed to reach the oil passage 45 and the suction port 82a of the electromagnetic pump 80, and suction of air is suppressed by the electromagnetic pump 80.

In the power transmission device 20 of the embodiment, the electromagnetic pump 80 that is operated by the electromagnetic force is provided. However, an electric pump that is operated by power from an electric motor or the like may be provided.

In the power transmission device 20 of the embodiment, the six-speed transmission 30 is provided. However, the transmission 30 is not limited to a six-speed transmission, and a transmission of any number of speeds such as four speeds, five speeds, eight speeds, and so on may be provided.

In the power transmission device 20 of the embodiment, the engine 12 is provided as a motor. However, motors other than engines may be provided.

The power transmission device 20 of the embodiment is mounted on the automobile 10 configured as a rear-wheel-drive vehicle. However, the power transmission device 20 may be mounted on a front-wheel-drive vehicle.

The following describes the corresponding relationships between the main elements of the embodiment and the main elements of the disclosure described in the SUMMARY. In the embodiment, the transmission 30 corresponds to a "transmission"; the transmission case 22 corresponds to a "case"; the hydraulic control device 50 corresponds to a "hydraulic control device"; the oil pump 40 corresponds to a "first pump"; the electromagnetic pump 80 corresponds to an "electromagnetic pump"; the oil passages 43 and 44 correspond to a "first oil passage"; and the oil passage 45 corresponds to a "second oil passage".

Note that the embodiment is merely a specific example of a mode for carrying out the disclosure described in the SUMMARY, and therefore the corresponding relationships between the main elements of the embodiment and the main elements of the disclosure described in the SUMMARY are not intended to limit the elements of the disclosure described in the SUMMARY. That is, the disclosure described in the SUMMARY should be interpreted based on the description therein, and the embodiment is merely a specific example of the disclosure described in the SUMMARY.

Although a mode for carrying out the disclosure has been described based on an embodiment, the present disclosure is not limited in any manner to the embodiment and may be carried out in various forms without departing from the sprit and scope of the present disclosure.

INDUSTRIAL APPLICABILITY

The present disclosure is applicable in the industry of manufacturing power transmission devices and the like.

The invention claimed is:

1. A power transmission device that is mounted on a vehicle and provided with a transmission having a plurality of engagement elements for transmitting power from a motor to an axle, a case that accommodates the transmission, and a hydraulic control device that controls hydraulic pressure to the plurality of engagement elements, the power transmission device comprising:
a hydraulic oil storing portion that stores hydraulic oil;
a first pump that is operated by power from the motor, and that suctions the hydraulic oil stored in the hydraulic oil storing portion and supplies the hydraulic oil with an increased pressure to the hydraulic control device;
a second pump that is configured as a reciprocating pump in which a piston reciprocates by receiving supply of electric power, and that suctions the hydraulic oil stored in the hydraulic oil storing portion and supplies the hydraulic oil with an increased pressure to a starting engagement element that is engaged when a vehicle starts, among the plurality of engagement elements;
a first oil passage that provides communication between the hydraulic oil storing portion and the first pump; and
a second oil passage that provides communication between the first oil passage and the second pump; wherein
the second oil passage is formed toward a suction port of the second pump so as to extend downward with respect to a horizontal direction throughout the whole second oil passage from a communication position communicating with the first oil passage.

2. The power transmission device according to claim 1, wherein
the first oil passage includes a body-side oil passage that is formed in a valve body of the hydraulic control device and communicates with the hydraulic oil storing portion via a strainer, and a case-side oil passage that is formed in the case and provides communication between the body-side oil passage and the first pump;
the second oil passage is formed in the valve body and provides communication between the case-side oil passage and the second pump;
the case-side oil passage, the second oil passage, and the second pump are arranged in this order from an upper side of the vehicle; and
the second pump is disposed such that the suction port overlaps the case-side oil passage in a vehicle up-down direction as seen from at least one of a vehicle front-rear direction and a vehicle left-right direction.

3. The power transmission device according to claim 2, wherein
the vehicle is a rear-wheel-drive vehicle; and
the second pump is disposed such that the suction port overlaps the case-side oil passage in the vehicle up-down direction as seen from the vehicle front-rear direction.

4. The power transmission device according to claim 3, wherein
the second pump is disposed such that the suction port overlaps the case-side oil passage in the vehicle up-down direction and/or overlaps an outlet of the strainer, as seen from the vehicle left-right direction.

5. The power transmission device according to claim 4, wherein
the power transmission device is mounted on the rear-wheel-drive vehicle such that a vehicle rear side of the rear-wheel-drive vehicle is disposed lower than a vehicle front side of the rear-wheel-drive vehicle; and
the second pump is disposed such that the suction port is located at a lower side with respect to the communication position and at the vehicle rear side communication position.

6. The power transmission device according to claim 5, wherein
the second pump is configured as an electromagnetic pump that generates hydraulic pressure by an electromagnetic force, and is mounted on the valve body.

7. The power transmission device according to claim 6, comprising:
a switching valve that forms, when the starting engagement element is to be engaged, a first state when the first pump is operated, and a second state when the first pump is not operated, the first state being a state in which the hydraulic oil discharged from the first pump and regulated is supplied to the starting engagement element, the second state being a state in which the hydraulic oil discharged from the second pump is supplied to the starting engagement element.

8. The power transmission device according to claim 1, wherein
the power transmission device is mounted on a rear-wheel-drive vehicle such that a vehicle rear side of the rear-wheel-drive vehicle is disposed lower than a vehicle front side of the rear-wheel-drive vehicle; and
the second pump is disposed such that the suction port is located at a lower side with respect to the communication position and at the vehicle rear side communication position.

9. The power transmission device according to claim 1, wherein
the second pump is configured as an electromagnetic pump that generates hydraulic pressure by an electromagnetic force, and is mounted on a valve body.

10. The power transmission device according to claim 1, comprising:
a switching valve that forms, when the starting engagement element is to be engaged, a first state when the first pump is operated, and a second state when the first pump is not operated, the first state being a state in which the hydraulic oil discharged from the first pump and regulated is supplied to the starting engagement element, the second state being a state in which the hydraulic oil discharged from the second pump is supplied to the starting engagement element.

* * * * *